United States Patent [19]

Otake et al.

[11] Patent Number: 5,111,090
[45] Date of Patent: May 5, 1992

[54] COOLING DEVICE OF A MOTOR FOR VEHICLE

[75] Inventors: Shin-ichi Otake, Aichi; Satoru Wakuta, Anjo, both of Japan

[73] Assignee: Aisin Aw Co., Ltd., Japan

[21] Appl. No.: 611,803

[22] Filed: Nov. 7, 1990

[30] Foreign Application Priority Data

Nov. 7, 1989 [JP] Japan .................. 1-290828

[51] Int. Cl.$^5$ .......................... H02K 9/00; H02K 9/20
[52] U.S. Cl. ..................................... 310/54; 180/229
[58] Field of Search ...................... 310/54, 58, 98, 52, 310/53, 63; 180/65.5, 65.6, 229

[56] References Cited

U.S. PATENT DOCUMENTS

| | | | |
|---|---|---|---|
| 3,812,928 | 5/1974 | Rockwell et al. | 180/65.5 |
| 4,079,275 | 3/1978 | Fu | 310/57 |
| 4,330,045 | 5/1982 | Myers | 180/65.5 |

FOREIGN PATENT DOCUMENTS

| | | | |
|---|---|---|---|
| 0069124 | 6/1977 | Japan | 180/65.5 |
| 1445989 | 12/1988 | U.S.S.R. | 180/65.5 |

Primary Examiner—Steven L. Stephan
Assistant Examiner—Ed To
Attorney, Agent, or Firm—Lorusso & Loud

[57] ABSTRACT

An oil-cooled electric motor for a vehicle including a rotational shaft rotatably supported by a casing, a rotor fixed to the rotational shaft, a stator disposed around the outer circumference of the rotor and fixed to the casing, a coil wound around the stator, and oil receiver and an oil pump mounted in the lower portion of the casing. An oil path is formed in the upper portion of the casing with openings directing oil onto the coil. An oil guide extends from one side of the casing toward the coil. Oil is pumped onto the coil via the oil path by an oil pump.

14 Claims, 2 Drawing Sheets

COOLING DEVICE OF A MOTOR FOR VEHICLE

FIELD OF THE INVENTION

The present invention relates to a cooling system of a motor for a vehicle, more specifically an electric automobile.

Today, development of electric automobiles is spurred by concern for environmental protection. Among the various known kinds of such electric automobiles, a vehicle having plural wheel motors is known in which each of the wheels is directly connected to a motor through a speed reducer.

In cases where each of the wheels is directly connected with a motor through a speed reducer, the car body and the motors or the speed reducers should not interfere with each other when the wheels move vertically or turn, and therefore, space for installing the motors and the speed reducers is limited. Accordingly, miniaturization of the motors and the speed reducers is required to the extent possible in order to install them in a limited space. On the other hand, in an electric automobile, in order to obtain high power for the weight of a car body, the motors should be miniaturized, their weight should be reduced and their output torque should be considerably increased.

However, a miniature motor which is light in weight and which has high output torque requires a large amount of electric current through its coil, raising the fear that the coil may burn. This is because (1) the heat resistance of the coil is large and (2) the heat resistance of an iron core which transfers heat by conduction to the case of the motor is large as the iron core is made of layered silicon steel plate. Thus, according to the increase of the heat density within the coil, the quantity of heat kept in the coil increases and the temperature of the coil rises rapidly.

Therefore, in order to attain performance targets for the motor, it is important to control the heat of the coil when it is overloaded, by cooling the coil.

Conventionally, to achieve such cooling, coolant such as oil is put inside the motor and the coil is cooled by stirring with a rotor.

However, in the conventional cooling device, as the coil is cooled only by stirring with a rotor, uniformity of cooling is not achieved and the coil may overheat locally, i.e. at the end of the coil, thus shortening the lifetime of the insulating material around the coil and causing burning of the motor. If the amount of the oil is increased for the purpose of cooling the whole of the coil, the output of the motor is lowered due to the resistance of stirred oil.

Further, because of the limitation of space for installation in an electric automobile as referred to above, it is quite difficult to provide space for installing a cooling device. If a cooling device is installed in the car body, there is the danger that a wheel and the cooling device may interfere with one another when the wheel moves vertically or turns to the right or to the left.

SUMMARY OF THE INVENTION

The object of the present invention is to solve the problems referred to above and to provide a cooling device for a vehicle electric motor, which motor can be miniaturized while providing a high output.

Briefly, the cooling device for a vehicle motor in accordance with the present invention includes a shaft 2a rotatably supported by a casing 1, a rotor 2b fixed to the shaft 2a, a stator 2c disposed around the outer circumference of the rotor and fixed to the casing, a coil 2d wound around the stator, an oil receiver 25 and an oil pump motor 26 which are disposed in the lower portion of the casing. An oil path 31 is formed in the upper portion of the casing facing the coil, and an oil guide 32 is disposed adjacent the inner circumference of the coil and is formed integrally with the casing. Oil is circulated around the coil through the oil path 31 by the oil pump motor 26.

In the present invention, oil is at a level at which it is not stirred with the rotor 2b of the motor 2. Oil for cooling is circulated by the oil pump motor 26 from the oil receiver 25, via oil path 30 and the upper oil path 31, and forms jets impinging against the coil 2d of the electric motor 2, i.e. from jets 31a and 31b. The jetted oil comes directly into contact with the coil. The oil from the jets is conveyed to an oil guide 32 and to a ring gear 23 and thereby cools the whole coil 2d evenly.

By the oil guide 32 and the ring gear 23, the amount of the cooling oil which drops on the side of the rotor 2b can be decreased and therefore the resistance to rotation can be decreased. Further, by enlarging the capacity of the oil receiver 25 to secure a sufficient capacity, the level of the oil can be lowered and therefore the resistance of rotation of the rotor 2b of the motor 2 can be decreased.

Accordingly, the heat of the coil is controlled by rapid and effective diffusion and the electric motor can be miniaturized and the output obtained can be increased accordingly.

DESCRIPTION OF THE PREFERRED EMBODIMENT

An embodiment of the present invention is described in the following with reference to the drawings.

Figure 1:
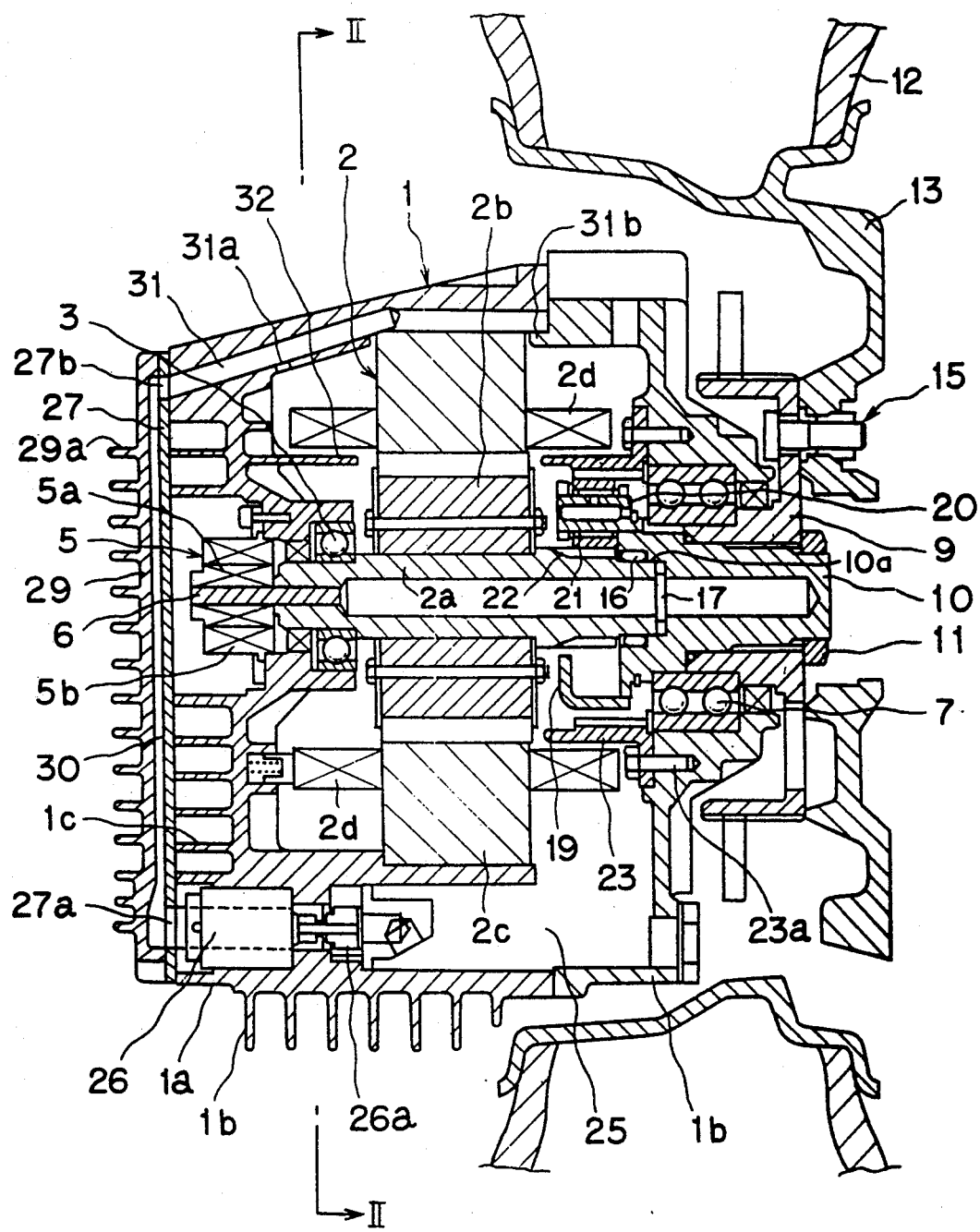
FIG. 1 is a sectional view showing an embodiment of a vehicular electric motor adapted for cooling in accordance with the present invention.

As shown in FIG. 1, a casing 1 is divided casing halves 1a and 1b. In cross-section the casing 1 is approximately circular. The casing 1 is fixed with bolts which are not shown. A plurality of fins for cooling 1c are provided on the outer circumference of the casing 1a. An electric motor 2 is housed in the casing 1. One end of a rotational shaft 2a of the electric motor 2 is supported by a bearing 3 mounted in the sidewall of the casing 1a. A rotor 2b of the electric motor 2 is fixed to the rotational shaft 2a. A stator 2c surrounding the rotor 2b is pressed in and fixed to the inside wall of the casing 1a. A coil 2d is wound around the stator 2c.

A motor rotation position detector 5 is disposed at the outside wall of the casing 1a. The motor rotation position detector 5 is fixed to a shaft 6 fixed in the rotational shaft 2a. A movable portion 5a of the motor rotation position detector 5 is fixed to the shaft 6. A fixed portion 5b of the rotation position detector 5 is fixed to the casing 1a.

A wheel hub 9 is rotatably supported on the sidewall of the casing 1b through a bearing 7. The wheel hub 9 is splined to an output shaft 10 and is axially fixed by nuts 11. A wheel 13 supporting a tire 12 is attached to the wheel hub 9 with a bolt and nut 15.

An axial recess 10a is formed at the left end of the output shaft 10. One end of the rotational shaft 2a of the motor 2 is received in recess 10a and is rotatably supported by bearings 16 and 17. A carrier 19 is attached to the output shaft 10. A predetermined number of shafts 20 are circumferentially installed at equal intervals between the carrier 19 and the output shaft 10. A planetary gear 21 is rotatably supported by each of the shafts 20. The planetary gear 21 is disposed so as to always be engaged with a sun gear 22 mounted at the other end of the motor rotational shaft 2a and with a ring gear 23 fixed to the inside wall of the casing 1b with a bolt 23a. The carrier 19, the shafts 20, the planetary gear 21, the sun gear 22, and the ring gear 23 constitute an epicyclic gear speed reducer (reduction device) which connects the rotational shaft 2a of the motor 2 with the output shaft 10.

Further, an oil receiver (oil reservoir) 25 is formed in the lower portion of the casing 1 and an oil pump motor 26 is attached outside the casing 1a, with the blades 26a of the oil pump motor 26 facing the oil receiver 25. An oil path cover (cooler passage) 29, on which a separate plate 27 and cooling fins 29a are formed, is attached to the outside of the casing 1a. An oil path 30 is formed between the separate plate 27 and the cooling fins 29a. Openings 27a and 27b are formed in the separate plate 27. The opening 27a provides fluid communication with the oil receiver 25 while the opening 27b provides fluid communication with an upper oil path 31 formed in the casing 1a. Jets (output ports) 31a and 31b directed toward the coil 2d are formed in the upper oil path 31.

Figure 2:
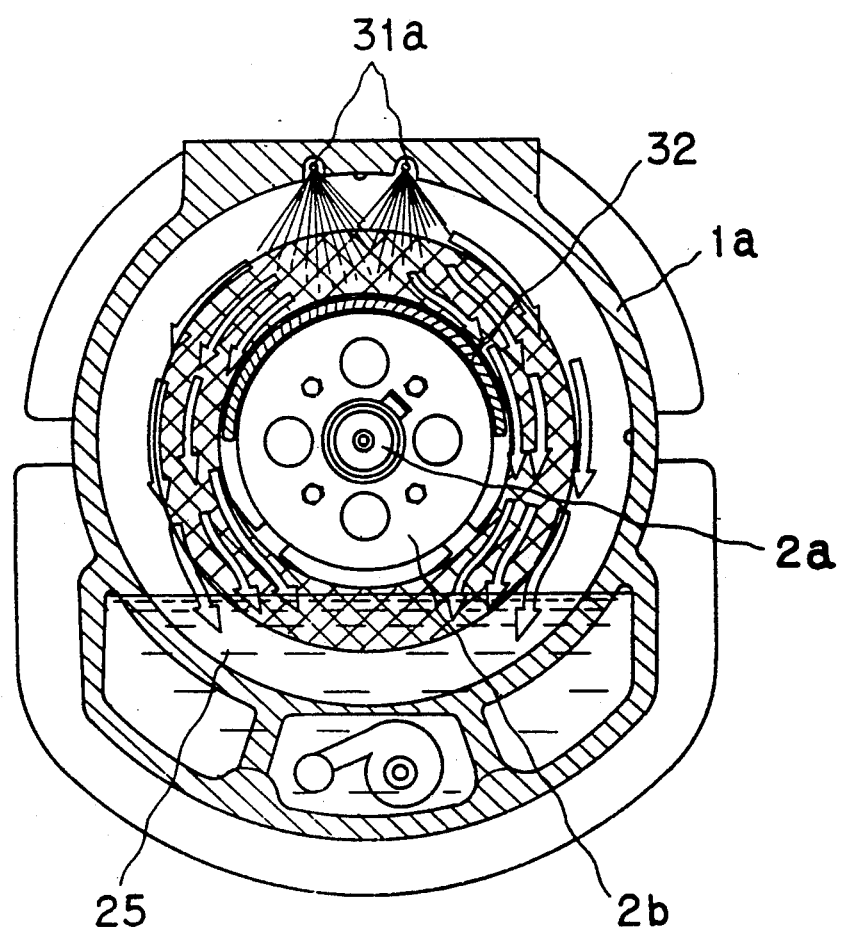
FIG. 2 is a sectional view of the embodiment taken on the line II—II of FIG. 1.

In the present invention, an oil guide 32 extending from the casing 1a is formed on the inner circumferential side at the left side of the coil 2d in FIG. 1. The ring gear 23 of the epicyclic gear speed reducer, disposed on the inner circumferential side of the casing, at the right side of the coil 2d, also plays a role as an oil guide. The oil guide 32 is, as shown in FIG. 2, arc-like.

The operation of the present invention as described is as follows. In the present invention, oil is held at a level at which the oil is not stirred by the rotor 2b of the motor 2. Oil for cooling is circulated by the oil pump motor 26 through the oil receiver 25, the oil path 30, and the upper oil path 31 and is jetted directly against the coil 2d of the electric motor 2 from the jets 31a and 31b. The falling oil is, as shown in FIG. 2, conveyed to the oil guide 32 and to the ring gear 23 and can cool the whole coil 2d evenly. As seen in FIG. 2, the oil guide 32 prevents oil from running onto the rotor 2b.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An oil-cooled electric motor for a vehicle comprising:
   a casing;
   a rotational shaft rotatably supported by the casing;
   a wheel mounted on said rotational shaft;
   a stator disposed around the circumference of said rotor;
   a coil wound around the stator;
   cooling means for supplying a flow of cooling oil onto the outer circumference of the coil; and
   oil guide means, extending from one side of the casing and disposed adjacent the inner circumference of said coil, for preventing the cooling oil from running onto said rotor.

2. An oil-cooled electric motor according to claim 1, wherein said cooling means comprises:
   an oil reservoir in the lower portion of said casing;
   an oil pump for circulating oil from the reservoir to the upper portion of said casing;
   an outlet port for directing the cooling oil onto the other circumference of said coil; and
   oil passage means for providing fluid communication between said reservoir and said output port.

3. An oil-cooled electric motor according to claim 2, containing oil at a level below and out of contact with said rotor.

4. An oil-cooled electric motor according to claim 2, wherein said casing is provided with a plurality of fins for cooling.

5. An oil-cooled electric motor according to claim 2, wherein said casing has a plurality of fins for cooling adjacent said reservoir.

6. An oil-cooled electric motor according to claim 1, further comprising:
   a reduction device connected between the rotational shaft and the wheel.

7. An oil-cooled electric motor according to claim 6, wherein said reduction device comprises:
   a planetary gear set including:
      a sun gear connected to said rotation shaft;
      a carrier connected to said wheel;
      a ring gear connected to the casing; and
      at least one planetary gear rotatably mounted on said carrier and engaging said sun gear and said ring gear.

8. An oil-cooled electric motor according to claim 7, wherein said ring gear is disposed around the inner circumference of the coil.

9. The oil-cooled electric motor of claim 1 wherein said oil-guide means is an arc-shaped shield extending into said coil.

10. The oil-cooled electric motor of claim 9 wherein said arc-shaped shield is concentric with said coil and said rotor.

11. The oil-cooled electric motor of claim 1 wherein said cooling means comprises a plurality of jets for directing streams of falling oil onto the outer circumference of the coil.

12. The oil-cooled electric motor of claim 2 wherein said outlet port is formed in said casing above the outer circumference of said coil.

13. The oil-cooled electric motor of claim 12 further comprising an oil passage connecting said oil reservoir with said outlet port and cooling fins for cooling oil passing through said oil passage.

14. The oil-cooled electric motor of claim 13 wherein said cooling fins include first and second opposed sets of cooling fins on opposite sides of said oil passage.

* * * * *

UNITED STATES PATENT AND TRADEMARK OFFICE
CERTIFICATE OF CORRECTION

PATENT NO.   : 5,111,090
DATED        : May 5, 1992
INVENTOR(S)  : OTAKE et al

It is certified that error appears in the above-identified patent and that said Letters Patent is hereby corrected as shown below:

On the title page: Item [73]

Under the heading "Assignee", "Aisin Aw Co., Ltd." should read --Aisin AW Co., Ltd.--.

IN THE CLAIMS:

Col. 3, line 64, after "on" insert --one end of--; and
    line 65, insert a subparagraph reading --a rotor mounted on said rotational shaft--.

UNITED STATES PATENT AND TRADEMARK OFFICE
CERTIFICATE OF CORRECTION

PATENT NO. : 5,111,090
DATED : May 5, 1992
INVENTOR(S) : Otake et al

It is certified that error appears in the above-indentified patent and that said Letters Patent is hereby corrected as shown below:

Col. 4, line 16, delete "other" insert --outer --.

Signed and Sealed this

Thirteenth Day of July, 1993

Attest:

MICHAEL K. KIRK

Attesting Officer

Acting Commissioner of Patents and Trademarks